(12) United States Patent
Alfes et al.

(10) Patent No.: US 11,801,483 B2
(45) Date of Patent: Oct. 31, 2023

(54) INTERNAL MIXER

(71) Applicant: Harburg-Freudenberger Maschinenbau GmbH, Hamburg (DE)

(72) Inventors: Steffen Alfes, Freudenberg (DE); Petra Noelling, Niederfischbach (DE); Maik Rinker, Gummersbach (DE); Harald Keuter, Freudenberg (DE); Markus Hesse, Freudenberg (DE); Andreas Limper, Freudenberg (DE)

(73) Assignee: Harburg-Freudenberger Maschinebau GmbH, Hamburg (DE)

( * ) Notice: Subject to any disclaimer, the term of this patent is extended or adjusted under 35 U.S.C. 154(b) by 0 days.

(21) Appl. No.: 16/966,495

(22) PCT Filed: Nov. 29, 2018

(86) PCT No.: PCT/EP2018/082918
§ 371 (c)(1),
(2) Date: Jul. 31, 2020

(87) PCT Pub. No.: WO2019/149404
PCT Pub. Date: Aug. 8, 2019

(65) Prior Publication Data
US 2021/0146321 A1  May 20, 2021

(30) Foreign Application Priority Data
Jan. 31, 2018 (DE) .................... 10 2018 201 482.5

(51) Int. Cl.
*B29B 7/18* (2006.01)
*B01F 27/707* (2022.01)
(Continued)

(52) U.S. Cl.
CPC ........ *B01F 27/707* (2022.01); *B01F 35/7174* (2022.01); *B01F 35/751* (2022.01); *B29B 7/186* (2013.01)

(58) Field of Classification Search
CPC ........ B29B 7/183; B29B 7/186; B29B 7/263; B01F 15/0237; B01F 15/0267; B01F 7/048
(Continued)

(56) References Cited

U.S. PATENT DOCUMENTS 1,200,070 A    10/1916  Banbury
1,324,170 A *  12/1919  Pletscher et al. ......... B29B 7/26
                                                       366/77
(Continued)

FOREIGN PATENT DOCUMENTS

DE    2059844 A1 *  6/1971  ............ B29B 7/183
GB    2173414 A     5/1985
SU    1692849       11/1991

*Primary Examiner* — David L Sorkin
(74) *Attorney, Agent, or Firm* — Robinson & Cole LLP

(57) ABSTRACT

An internal mixer includes a mixing chamber enclosed by a housing, a feeding neck in which a ram is guided, a closable discharge door, and an intermeshing rotor system, composed of a pair of rotors that can each be rotated about a rotor longitudinal axis, each rotor comprising a rotor main body on which at least one respective rotor blade is arranged, and the rotor blades of the two rotors meshing with one another, is to be refined in such a way that an improved, that is, faster, pull-in behavior is achieved, while optimizing the dispersion and distribution of the introduced materials. To this end, it is provided that in the case of at least one of the rotors, the rotor main body, at least in sub-regions, is non-cylindrical and has a non-circular cross-section, in the surface sections in which no rotor blades are arranged on the rotor main body.

20 Claims, 7 Drawing Sheets

(51) Int. Cl.
*B01F 35/75* (2022.01)
*B01F 35/71* (2022.01)

(58) Field of Classification Search
USPC .......................................... 366/97, 76.7, 76.8
See application file for complete search history.

(56) References Cited

U.S. PATENT DOCUMENTS

| | | | | |
|---|---|---|---|---|
| 1,936,248 A | | 11/1933 | Lasch | |
| 2,559,418 A | * | 7/1951 | Ford | B29B 7/7495 366/91 |
| 2,922,377 A | * | 1/1960 | Whitfield | F04C 2/084 418/94 |
| 3,468,518 A | * | 9/1969 | Koch | B29B 7/7495 366/76.7 |
| 3,490,750 A | * | 1/1970 | Brennan | B29B 7/183 366/85 |
| 3,672,644 A | * | 6/1972 | Crixell | B29B 7/183 366/84 |
| 4,058,297 A | * | 11/1977 | Seufert | B29B 7/183 366/81 |
| 4,234,259 A | * | 11/1980 | Wiedmann | B29B 7/183 366/81 |
| 4,284,358 A | * | 8/1981 | Sato | B29B 7/7495 366/97 |
| 4,300,838 A | * | 11/1981 | Sato | B29B 7/186 366/84 |
| 4,714,350 A | * | 12/1987 | Nortey | B29B 7/7495 366/84 |
| 4,744,668 A | * | 5/1988 | Nortey | B29B 7/186 366/76.7 |
| 4,775,240 A | * | 10/1988 | Passoni | F16C 19/00 366/97 |
| 4,834,543 A | * | 5/1989 | Nortey | B29B 7/186 366/97 |
| 4,859,074 A | * | 8/1989 | Asai | B29B 7/186 366/97 |
| 4,871,259 A | * | 10/1989 | Harada | B29B 7/7495 366/85 |
| 4,893,936 A | * | 1/1990 | Borzenski | B29B 7/263 366/76.7 |
| 4,914,635 A | * | 4/1990 | Nishigai | B29B 7/7495 366/97 |
| 4,917,501 A | * | 4/1990 | Simonet | B29B 7/826 366/99 |
| 5,044,760 A | * | 9/1991 | Asai | B29B 7/183 366/97 |
| 5,520,455 A | * | 5/1996 | Yamada | B29B 7/183 366/97 |
| 5,672,006 A | * | 9/1997 | Hanada | B29B 7/7495 366/84 |
| 5,791,776 A | * | 8/1998 | Takakura | B29B 7/186 366/84 |
| 5,984,516 A | * | 11/1999 | Inoue | B29B 7/186 366/97 |
| 6,402,360 B1 | * | 6/2002 | Nortey | B29B 7/183 366/85 |
| 6,494,607 B2 | * | 12/2002 | Valsamis | B29B 7/22 366/84 |
| 6,811,295 B2 | * | 11/2004 | Koro | B29B 7/183 |
| 7,476,017 B2 | * | 1/2009 | Mortimer | B29B 7/26 366/76.7 |
| 7,677,789 B2 | * | 3/2010 | Huffstetler | F16C 19/00 366/97 |
| 8,882,337 B2 | * | 11/2014 | Yoshida | B29B 7/183 366/81 |
| 2001/0050880 A1 | * | 12/2001 | Regalia | B29B 7/26 366/76.7 |
| 2006/0104154 A1 | * | 5/2006 | Inoue | B29B 7/183 366/97 |
| 2021/0146321 A1 | * | 5/2021 | Alfes | B29B 7/183 |

\* cited by examiner

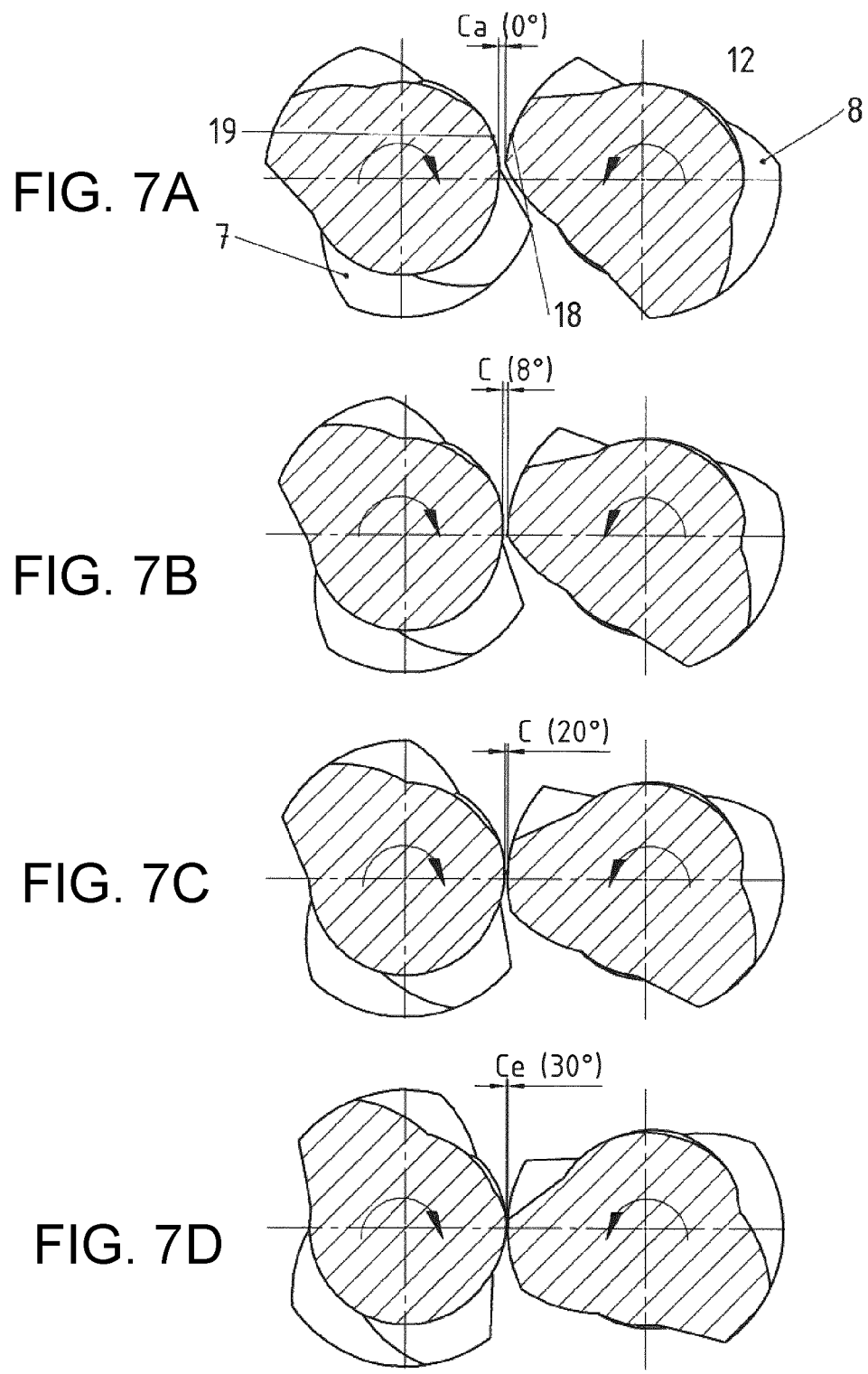

INTERNAL MIXER

This application is entitled to the benefit of, and incorporates by reference essential subject matter disclosed in PCT Application No. PCT/EP2018/082918 filed on Nov. 29, 2018, which claims priority to DE Patent Appln. No. 10 2018 201 482.5 filed Jan. 31, 2018, which are hereby incorporated by reference in their entireties.

BACKGROUND OF THE INVENTION

1. Technical Field

The invention relates to an internal mixer, comprising a mixing chamber enclosed by a housing, a feeding neck in which a ram is guided, a closable discharge door, and an intermeshing rotor system, composed of a pair of rotors that can each be rotated about a rotor longitudinal axis, wherein each rotor comprises a rotor main body on which at least one respective rotor blade is arranged, and the rotor blades of the two rotors mesh with one another.

2. Background Information

Mixers comprising rotors are known, which have rotor blades that are only tangential, and in which the material supplied via the feeding neck can be pulled very quickly and completely into the mixing chamber due to the large clearance between the rotors. As a result of the material being pulled in quickly, the mixers comprising tangential rotors ensure high throughput, however both the dispersion (disaggregating of the introduced solids) and the distribution (spreading of the substances on a macroscopic scale) are poor since the mixing action is only created between the rotor blade tips of the two rotors and the inner wall of the mixing chamber.

U.S. Pat. No. 1,200,070 and German Patent No. DE 20 59 844 A1 disclose such a mixer comprising tangential rotors, which is known under the designation Banbury mixer.

In contrast, in a generic internal mixer, comprising intermeshing rotor blades, a mixing action arises both between the mixing chamber and the rotor blade tips, and between the rotor blade flanks when the rotor blades of the two rotors move toward one another, as well as between the rotor main bodies and the rotor blade tips themselves during engagement of the two rotors, whereby both the dispersion and the distribution of the fed materials are very good. Here as well, the charged materials are pulled in via the clearance between the rotors. The disadvantage, however, is that the resulting clearance between the tips of the rotor blades of a rotor and the circular cylindrical rotor main body of the second rotor, over which the tips of the first rotor roll, is only very small. As a result, the materials introduced via the feeding neck are only pulled in very slowly, whereby, on the one hand, the overall throughput of internal mixers comprising intermeshing rotor blades is lower than with internal mixers comprising tangential rotor blades, wherein it has likewise been found to be disadvantageous that the dispersion behavior during the introduction of the material worsens. The initially very good dispersion behavior grows worse as a result of the materials that are already mixed in the mixing chamber, the viscosity of which decreases as a result of the mixing process and the resulting rising temperatures. This means that the materials that are introduced into the mixing chamber at the end of the filling process already meet with lower-viscosity mixtures in the mixing chamber than the materials that are introduced at the beginning, so that the remaining materials that are introduced are more difficult and labor-intensive to spread.

In addition to many contours of rotors for tangential mixers known, for example, from DE 697 30 480 T2 or DE 689 03 047 T2, in which the contour of the respective adjoining rotors can be disregarded, the prior art of internal mixers comprising intermeshing rotor blades is formed by rotors comprising circular cylindrical rotor main bodies, on which rotor blades are arranged, as is known from DE 28 36 940 C2 or EP 2 409 822 B2, for example.

U.S. Pat. No. 2,559,418 discloses a trough mixer comprising intermeshing rotor blades, wherein each rotor main body is provided entirely, that is completely and over the entire axial length thereof, with rotor blades so that the blade tips of the one rotor only interact with blade regions of the second rotor, and not with the rotor main body. The cooperation of the rotor blades and the resulting open regions cause the materials to be mixed to be forced in the axial direction, and causes a transfer of the materials to be mixed to the second rotor. The trough mixer is not subject to any problems with respect to the pull-in behavior since the materials to be mixed are not pressed by the ram between the rotors, as is the case with a closed internal mixer, but float in the open trough on the rotors until they are pulled in between the rotors by the same. This results in considerably longer mixing times than with closed internal mixers.

It is the object of the invention to refine generic internal mixers comprising rotors having intermeshing rotor blades in such a way that an improved, that is, faster, pull-in behavior is achieved, while optimizing the dispersion and the distribution of the introduced materials.

SUMMARY OF THE INVENTION

To achieve this object, it is provided that, in the case of at least one of the rotors, the rotor main body, at least in sub-regions, is non-cylindrical and has a non-circular cross-section, in the surface sections in which no rotor blades are arranged on the rotor main body, and which are located in the interaction region with the rotor blade tips of the second rotor, wherein non-cylindrical and non-circular denote an arbitrary envelope of the rotation main body in the interaction surface sections in which recesses are deliberately introduced in certain locations into the surface of the rotor main bodies or elevations applied onto the surface of the rotor main bodies.

In this way, it is achieved that the height of the clearance for the mixing run, as the materials are pulled in from the feeding neck, can be influenced at least in sub-regions in one of the interaction regions, namely between the rotors, that is, between the rotor blade tip of the one rotor and the rotor main body of the second rotor. The surface of the second rotor main body may recede, for example in regions, whereby larger open clearances are achieved in this region for the material that is introduced through the feeding neck, and thereby faster pull-in of the material is ensured. Good dispersion is achieved by the regions between the rotor blade tip of the one rotor and the rotor main body of the second rotor, in which the surface of the second rotor main body does not recede, for example, but even protrudes.

As a result of the regions of an increasing clearance between the rotor blade tip of the one rotor and the rotor main body of the second rotor, a flow of the material toward this sub-region of the rotor that is non-cylindrical and has a non-circular cross-section is achieved during the mixing process, whereby the distribution with the intermeshing rotor blades is enhanced yet again.

A non-cylindrical sub-region of the rotor main body could be designed, for example, in a conically tapering manner. If the sub-region of the rotor main body were cylindrical, but had a non-circular cross-section, the recesses in the rotor main body could be designed to be recurring. Non-cylindrical and non-circular may then yield an arbitrary envelope of the rotor main body in the interaction surface segments in which no rotor blades are arranged on the rotor main body, in which recesses or elevations are deliberately introduced in certain locations into the surface of the rotor main bodies or applied onto the surface of the rotor main bodies. It is possible that not only the second rotor main body, but both rotor main bodies have a non-cylindrical design at least in sub-regions and a non-circular cross-section in the interaction region.

Advantageously, it is provided in this regard that, in the aforementioned sub-regions of the rotor main body, the distance between the rotor main body surface and the rotor longitudinal axis is different between at least two planes that are situated perpendicularly to the rotor longitudinal axis, the axial positions of which can be predefined, at least along a rotor main body circumferential segment.

In this way, for example, a recess can be provided in a previously established location on one of the rotor main bodies on which no rotor blades are arranged. At this location, the clearance with respect to the rotor blade tips of the second rotor thereby increases, wherein the increased clearance helps to improve the material pull-in.

It is advantageous that the differing distance can be provided in the radial and/or axial directions. In this way, it is achieved that the size of the above-described clearance and/or the axial position therefore can be influenced.

If the distances change steadily, no edges arise which could wear more extensively during operation, and to which mixtures could adhere. As a result, the clearance can change, for example along the length of the rolling region or interaction region, in a steadily increasing or decreasing manner, or progressively or degressively following a function.

When the clearance between one of the rotor main bodies and the tips of the rotor blades of the second rotor main body decreases or increases in the direction of the rotor longitudinal axes toward the rotor ends, it is achieved, in the case of a reduction, that a larger, above-described clearance arises in the center of the rotors, whereby very good pull-in is ensured, while very good dispersion work is achieved at the ends of the rotors. Additionally, an increased flow of the material from the end regions of the rotors toward the center is achieved by the clearance increasing close to the center of the rotors, whereby the distribution of the materials is increased. Another advantage that results is that the burden on the dust seal acting between the end-face mixing chamber inner wall and the respective end face of the rotors is decreased. A clearance that initially increases, for example toward one of the rotor ends, and then decreases causes at least one eccentric, larger clearance, and thus faster pull-in of the materials from the feeding neck.

According to some embodiments of the invention, the aforementioned sub-region may extend along the entire interaction region of the rotor main body on which no rotor blades are arranged, whereby overall action can be taken to improve pull-in, dispersion and distribution of the materials.

In addition to single-blade or other multi-blade rotors, it has proven useful in some embodiments for the at least one rotor to comprise a centrally arranged, long rotor blade that extends along at least half the rotor length and is helically arranged on the rotor main body, as well as likewise helically designed, shorter rotor blades in the respective end regions of the rotor, for the pitch of one of the rotor blades to be in the opposite direction in relation to the pitch of the two other rotor blades, and for passages for material to be mixed to be provided between the free ends of the rotor blades.

In this way, elevations or recesses can be provided in every location of the interaction sub-regions of the rotor main body over which a rotor blade tip rolls.

BRIEF DESCRIPTION OF THE DRAWINGS

The invention will be described in more detail based on drawings.

FIGS. 7A-7D show four snapshots of two rotors during an approximately 30° rotation, seen from FIG. 6A in the direction of arrows D-D.

DETAILED DESCRIPTION

Figure 1:
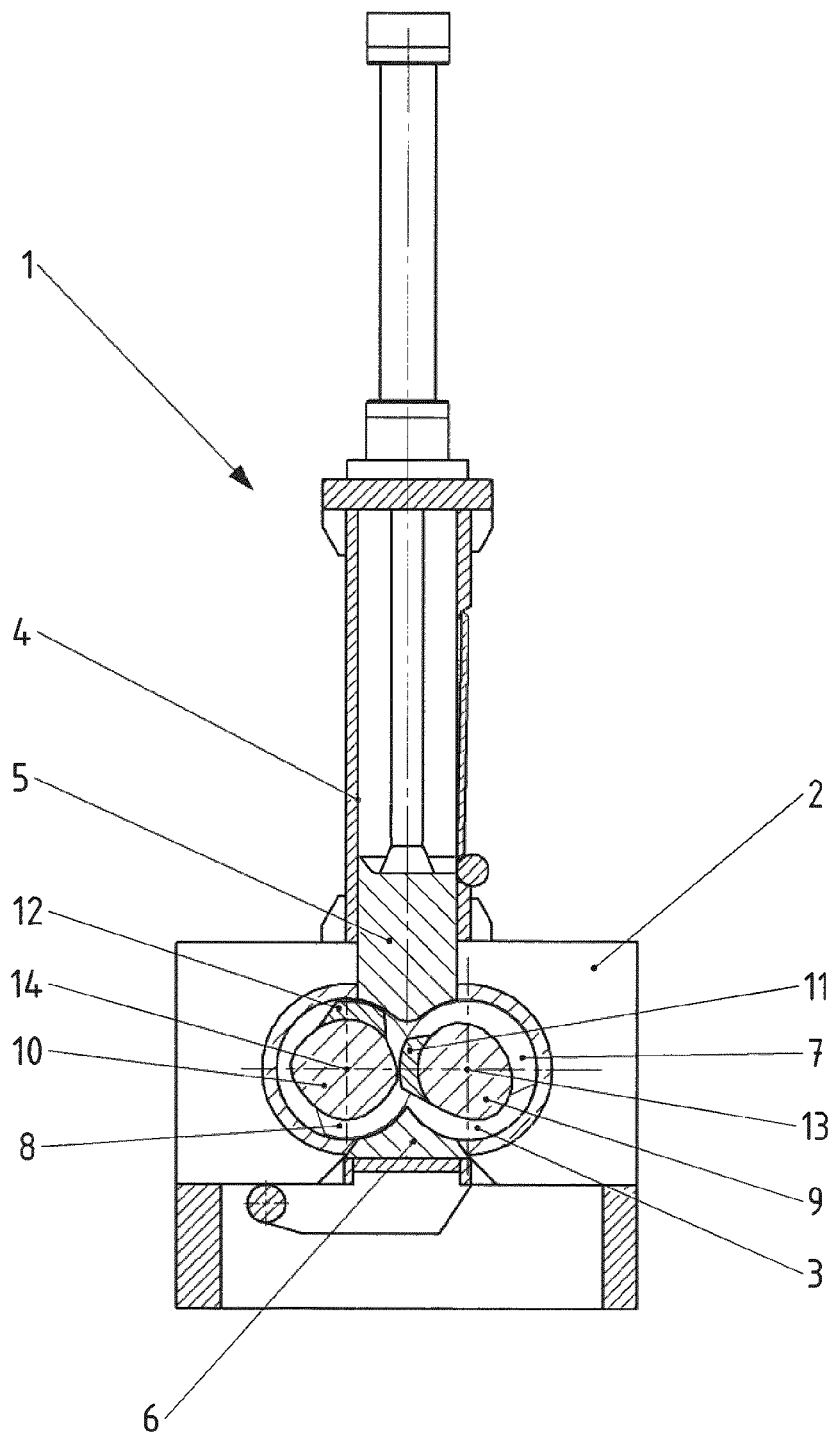
FIG. 1 shows a representative illustration of an internal mixer according to the invention.

FIG. 1 shows an internal mixer 1 according to the invention, comprising a housing 2 that encloses a mixing chamber 3, and a feeding neck 4 including a ram 5 by way of which the mixing chamber 3 can be closed toward the top. Furthermore, a closable discharge door 6 is apparent, which is able to close the mixing chamber 3 toward the bottom, wherein the finished mixed product can be discharged from the mixing chamber 3 when the discharge door 6 is open.

Moreover, two rotors 7 and 8, including the rotor main bodies 9 and 10 thereof and the rotor blades 11 and 12, are apparent. The rotor longitudinal axes 13 and 14 of the rotors 7 and 8 are located so closely together that the rotors 7 and 8 intermesh with the blades 11 and 12 thereof.

Figure 2:
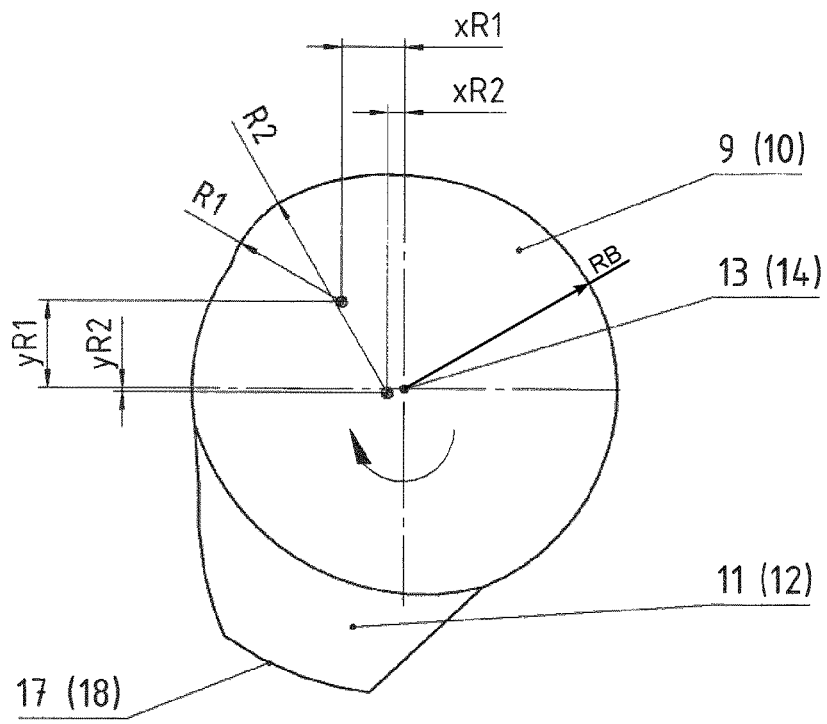
FIG. 2 shows a schematic side view of a rotor comprising rotor blades.

FIG. 2 shows a rotor 7, (8) comprising the rotor main body 9, (10) and the rotor blades 11, (12), which end in the rotor blade tips 17, (18). The rotor longitudinal axis 13, (14) is likewise hinted at. The hinted-at two radii R1 and R2, the centers of which are arranged offset from the rotor longitudinal axis 13, (14) by the magnitudes YR1-XR1 and YR2-XR2, shows that the rotor 7, (8) does not comprise a circular cylindrical main body, as is the case with rotors known to date, but that the rotor main body 9, (10) can have an arbitrary envelope, wherein the radius RB is smaller, for example, in the locations in which no rotor blades 11, (12) are provided than in the remaining regions of the rotor main body 9, (10) so as to improve the pull-in behavior.

Figure 3:
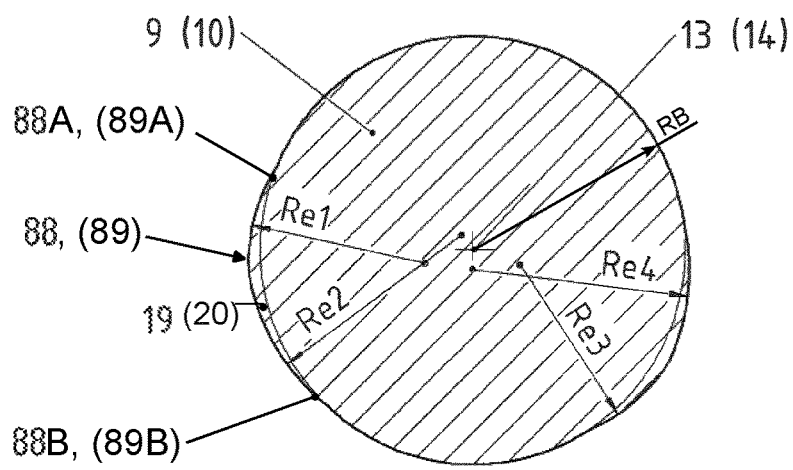
FIG. 3 shows a sectional view through a rotor main body without rotor blades.

FIG. 3 shows, as a further example, the cross-section through a rotor main body 9, (10), wherein the rotor longitudinal axis 13, (14) and centers deviating therefrom are apparent for different radii Re1 to Re4. In the end regions of the rotor main bodies 9, (10), elevations have been applied to the rotor main body 9, (10) here, as a result of which the rotor main body loses the circularly hinted-at form thereof, and whereby the clearances between the rotor main body 9, (10) of the first rotor 7, (8) and the rotor blade tips of the second rotor 8, (7) become even narrower in the edge region, so that particularly good dispersion work can be achieved in this region.

Figure 4:
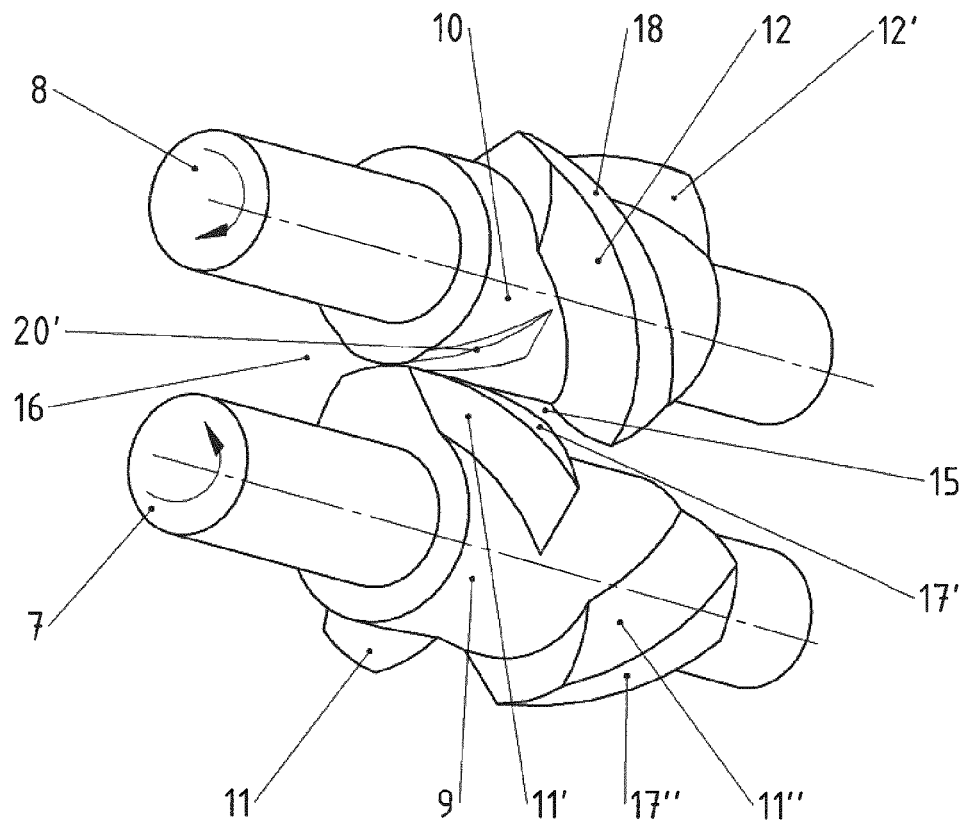
FIG. 4 shows two rotors according to the invention.

FIG. 4 shows a perspective illustration of the rotors 7 and 8, including the rotor main bodies 9 and 10 thereof and rotor blades 11, 11', 11" and 12, 12', 12". It is apparent here that the clearance between the rotor main body 10 and the rotor blade tip 17" in the axial direction and in the direction of rotation is larger in a center region 15 than in the edge region 16. As a result of the clearance increasing from the edge region 16 to the center region 15, it is achieved that the material to be mixed, after having been pulled from the feeding neck 4 and distributed in the mixing chamber 3, can flow in the direction toward the center region 15, where more space is available for the material. This improves the distribution of the material. In contrast, particularly good dispersion work is achieved in the small clearance in the edge region 16.

This not only improves the pull-in, but also optimizes the dispersion and distribution of the materials.

Figure 5:
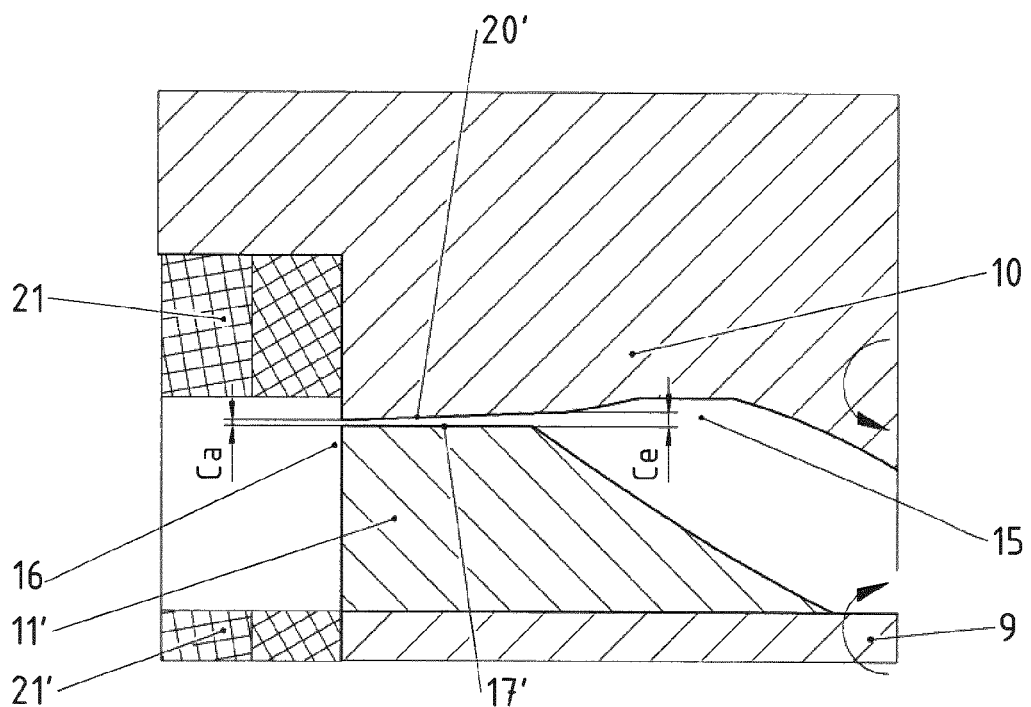
FIG. 5 shows a detail between the two rotors according to the invention.

FIG. 5 shows a detail of FIG. 4. The rotation main bodies 9 and 10 are apparent here. At the same time, it is apparent that the clearance is considerably smaller in the edge region 16 than toward the rotor center 15. Furthermore, one of the dust seals 21 at the end of the rotor is shown.

Figure 6A:
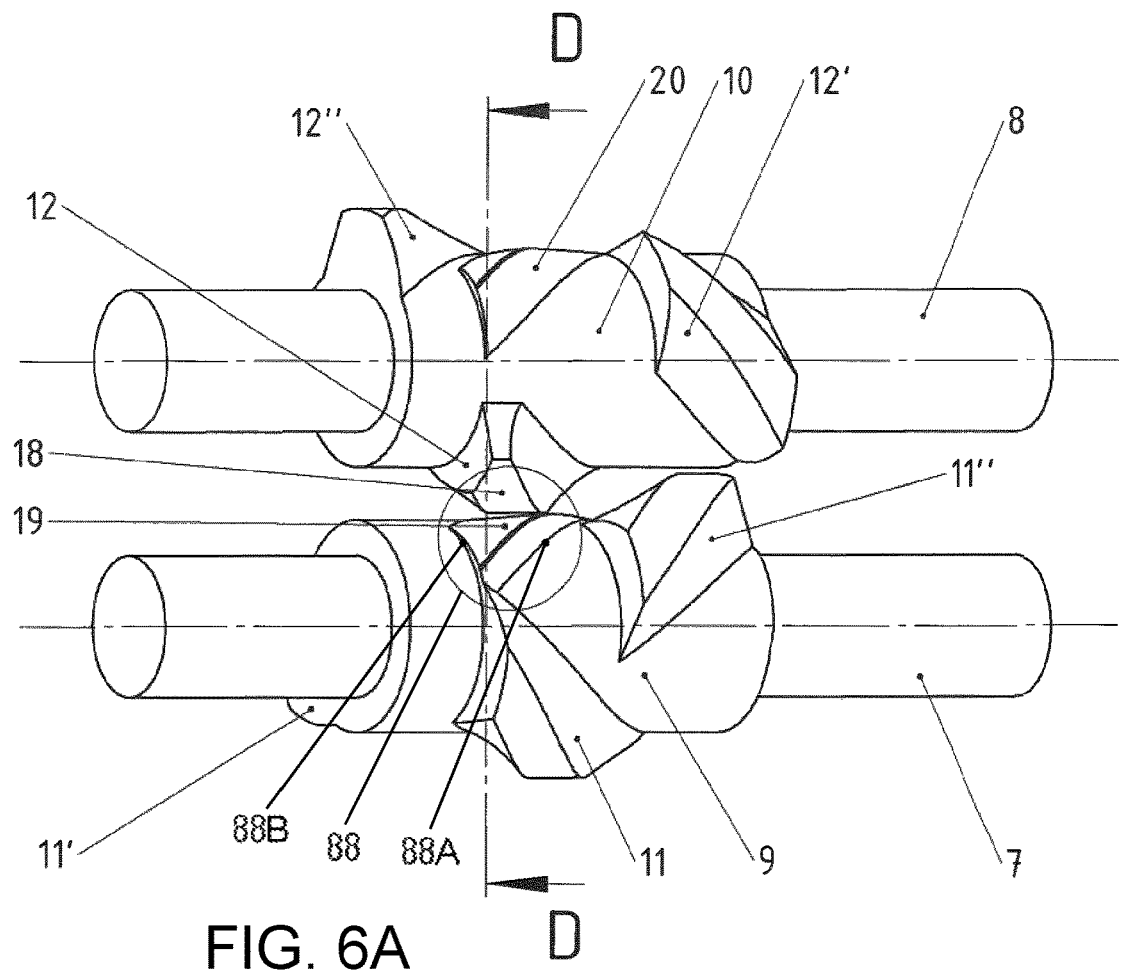
FIG. 6A shows two perspectively illustrated rotors according to the invention.

FIG. 6A, similarly to FIG. 4, shows a perspective illustration of two rotors 7, 8 of a rotor pair. In addition to rotor blades 11, 11', 11"; 12, 12', 12", elevations 19, 20 according to the invention are shown both on the rotor main body 9 of the rotor 7 and on the rotor main body 10 of the rotor 8, the rotor main bodies 9, 10 not being cylindrical and having non-circular cross-sections in the region of the elevations.

Figure 6B:
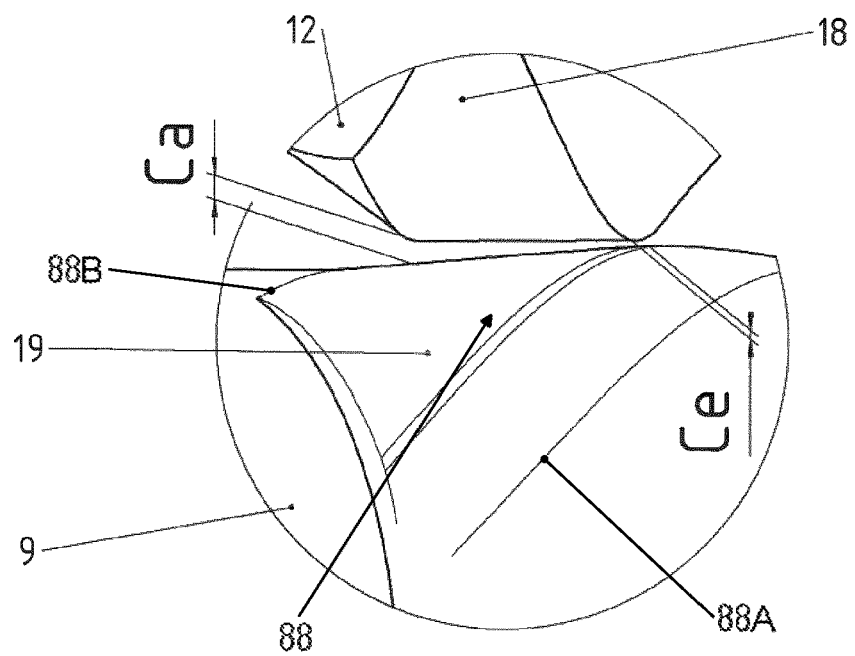
FIG. 6B shows a detail of the interaction region shown in FIG. 6A.

In a detail, FIG. 6B shows the interaction region 88 in which the rotor blade 12 meets with the elevation 19, wherein it is apparent that the radial distance of the rotor blade tip 18 decreases toward the elevation 19 in the direction of rotation of the rotors.

FIG. 7 shows four snapshots of two rotors according to the invention during an approximately 30° rotation of the rotors. The changes in the clearance during a quasi rolling process between the blade tip 18 of the rotor 8 toward the rotor main body 9 of the rotor 7 are apparent. FIG. 7A shows a large clearance Ca at the start at 0°. The clearance C after 8° according to FIG. 7B is already smaller, and decreases over FIG. 7c at 20°, until the clearance at the end of Ce at 30° according to FIG. 7D is almost no longer apparent.

Figure 8:
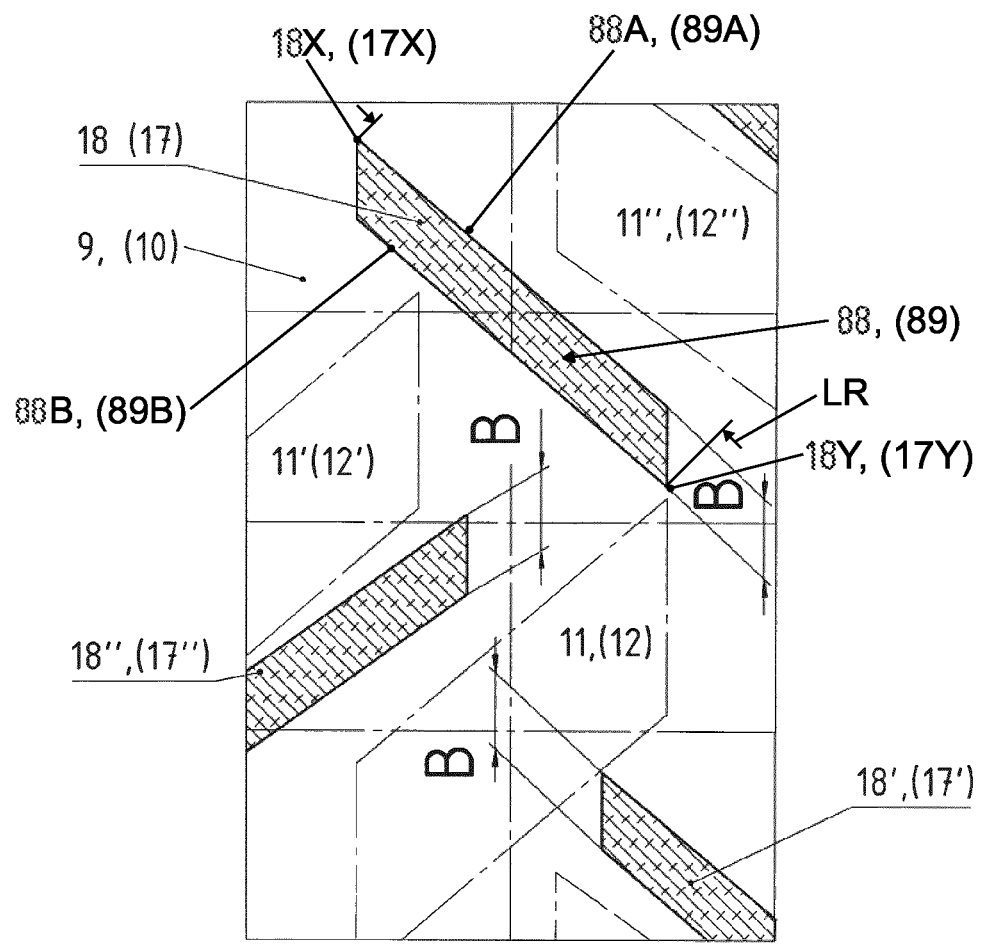
FIG. 8 shows the developed view of a rotor main body of a first rotor, including the roll areas or the rotor blade tips of a second rotor.

FIG. 8, by way of example, shows the development of a rotor 7, (8), wherein rotor blades 11, (12); 11', (12'); 11", (12") are apparent on the rotor main body 9, (10). An interaction region 88, (89) between the meshing two rotors 7, 8 is: (i) defined by the sub-region surface section 19, (20) of the rotor main body 9, (10) and the rotor blade tip 18, (17) of the rotor main body 10, (9) during an interaction length, and (ii) bounded by the first transition 88A, (89A) and the second transition 88B, (89B). The interaction length LR extends from one end 18X, (17X) of the rotor blade tip 18, (17) to an opposing end 18Y, (17Y) of the rotor blade tip 18, (17). The interaction region 88, (89) of the rotor blade tips 18, (17); 18', (17'); 18", (17"), which roll on the rotor main body 9, (10) during a revolution between rotor blades 11, (12); 11', (12'); 11", (12"), are shown hatched. The shown length B corresponds to the radian of the rotor blade tips 18, (17); 18', (17'); 18", (17").

FIG. 9 shows four examples as to how the clearance contour changes with different changes of the recesses/elevations that result according to the invention.

Figure 9A:
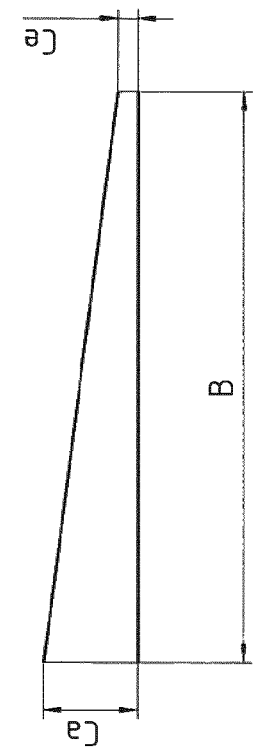
FIGS. 9A-9D show four examples of a variation of the clearance contours.

FIG. 9A shows the clearance contour with a linearly decreasing recess. Ca represents the clearance width at the start of the interaction between the rotor blade tip of the one rotor and the rotor main body of the other rotor. Ce represents the clearance width at the end of the interaction, while B shows the radian of the blade tip, which corresponds to the interaction length perpendicularly to the rotor longitudinal axis.

Figure 9B:
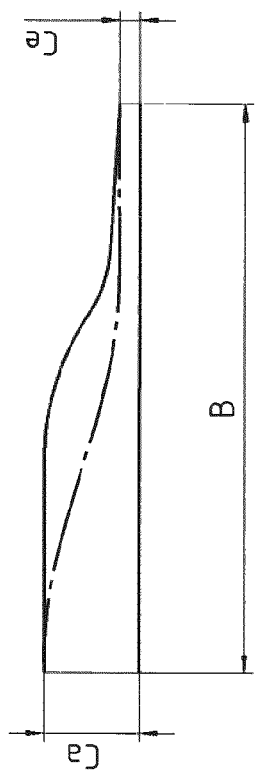
Figure 9C:
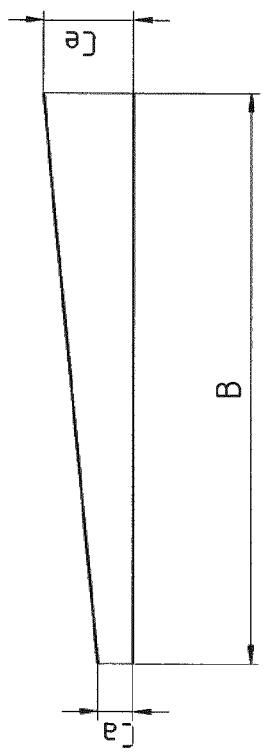

In FIG. 9B, the depth of the recess changes in a non-linear manner. Two different examples for this non-linearity are indicated.

FIG. 9C shows the recess again in a linear manner, or shows a linear elevation at the rotor main body.

Figure 9D:
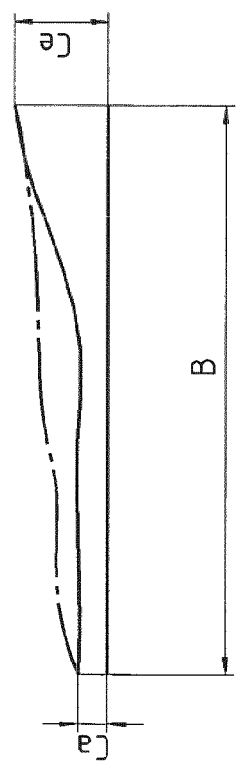

FIG. 9D, in contrast, shows two examples of a non-linear elevation of the rotor main body.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. An internal mixer, comprising:
   a mixing chamber enclosed by a housing;
   a feeding neck in which a ram is guided;
   a closable discharge door; and
   an intermeshing rotor system, comprising a first rotor (FR) and a second rotor (SR), the FR rotatable about a first longitudinal axis and the SR rotatable about a second longitudinal axis, the FR and the SR each having a rotor main body having a main body radius of curvature on which at least one rotor blade having a blade tip is arranged,
   wherein the FR and the SR are arranged to mesh with one another during at least a portion of a rotational revolution in an interaction region defined by at least a portion of the rotor blade tip of the SR and a sub-region of the FR that is facing the rotor blade tip during the portion of the rotational revolution;
   wherein the FR includes a transition from the main body radius of curvature to a sub-region radius of curvature that is different from the main body radius of curvature,
   wherein the portion of the rotational revolution includes a degree of rotation, and
   wherein the sub-region includes a sub-region surface section and at the degree of rotation the rotor blade tip of the SR and the sub-region surface section of the FR are separated from one another by a distance that varies.

2. The internal mixer according to claim 1, wherein the main body radius of curvature has a first center point along the first longitudinal axis and the sub-region radius of curvature has a second center point that is offset from the first longitudinal axis.

3. The internal mixer according to claim 1, wherein the distance varies in an axial direction.

4. The internal mixer according to claim 1, wherein the distance varies continuously through the interaction region.

5. The internal mixer according to claim 1, wherein the distance decreases in a direction toward an axial end of the FR.

6. The internal mixer according to claim 1, wherein the rotor tip includes a first edge, a second edge, and a central portion positioned between the first edge and the second edge, and wherein the distance increases in at least a portion between the first edge and the central portion and decreases in at least a portion between the central portion and the second edge.

7. The internal mixer according to claim 1, wherein the FR has an axial length and comprises a first end region rotor blade, a second end region rotor blade, and middle rotor blade disposed axially between the first end region rotor blade and the second end region rotor blade;
wherein the middle rotor blade has an axial length that is at least half the axial length of the FR and is helically configured; and
wherein each of the first end region rotor blade, the second end region rotor blade, and the middle rotor blade has a pitch, and the pitch of one of the first end region rotor blade, the second end region rotor blade, or middle rotor blade is oppositely disposed relative to the pitch of the others of the first end region rotor blade, the second end region rotor blade, and the middle rotor blade.

8. The internal mixer according to claim 1, wherein the FR has an axial length, and the at least one sub-region surface section extends along the entire axial length of the FR rotor main body.

9. The internal mixer of claim 1, wherein the sub-region surface section includes one or more elevated portions.

10. The internal mixer of claim 2, wherein the second center point is offset from the first longitudinal axis in a horizontal direction and a vertical direction.

11. The internal mixer of claim 1, wherein the distance varies in a linear manner.

12. The internal mixer of claim 1, wherein the distance varies in a non-linear manner.

13. An internal mixer, comprising:
a mixing chamber enclosed by a housing;
a feeding neck in which a ram is guided;
a closable discharge door;
a first rotor (FR) having a first rotor main body, a first rotor blade tip, and a first sub-region, the FR positioned in the mixing chamber and rotatable about a first longitudinal axis; and
a second rotor (SR) having a second rotor main body, a second rotor blade tip, and a second sub-region, the SR positioned in the mixing chamber and rotatable about a second longitudinal axis,
wherein the FR and the SR are arranged to mesh with one another during a first portion of a rotational revolution in a first interaction region defined by at least a portion of the second rotor blade tip and the first sub-region facing the second rotor blade tip during the first portion of the rotational revolution,
wherein the first sub-region includes a first transition from the first main body radius of curvature to a first sub-region radius of curvature that is different from the first main body radius of curvature,
wherein the first portion of the rotational revolution includes a first degree of rotation, and
wherein the first sub-region includes a first sub-region surface section and at the first degree of rotation the second rotor blade tip and the first sub-region surface section are separated from one another by a first range of varying distances,
wherein the FR and the SR are arranged to mesh with one another during a second portion of a rotational revolution in a second interaction region defined by at least a portion of the first rotor blade tip and the second sub-region facing the first rotor blade tip during the second portion of the rotational revolution,
wherein the second sub-region includes a second transition from the second main body radius of curvature to a second sub-region radius of curvature that is different from the second main body radius of curvature,
wherein the second portion of the rotational revolution includes a second degree of rotation, and
wherein the second sub-region includes a second sub-region surface section and at the second degree of rotation the first rotor blade tip and the second sub-region surface section are separated from one another by a second range of varying distances.

14. The internal mixer of claim 13, wherein the first range of distances vary in a linear manner.

15. The internal mixer of claim 13, wherein the distances vary in an axial direction and a radial direction.

16. The internal mixer according to claim 13, wherein the first rotor tip includes a first edge and a central portion, and wherein the first range of distances increases in at least a portion between the first edge and the central portion.

17. The internal mixer according to claim 13, wherein the first rotor tip includes an outer surface and wherein at the first degree of rotation the outer surface is at a constant distance from the first longitudinal axis.

18. An internal mixer, comprising:
a mixing chamber enclosed by a housing;
a feeding neck in which a ram is guided;
a closable discharge door; and
an intermeshing rotor system, comprising a first rotor (FR) and a second rotor (SR), the FR rotatable about a first longitudinal axis and the SR rotatable about a second longitudinal axis, the FR and the SR each having a rotor main body having a main body radius of curvature on which at least one rotor blade having a blade tip is arranged,
wherein the FR and the SR are arranged to mesh with one another during a portion of a rotational revolution in an interaction region defined by at least a portion of the rotor blade tip of the SR and a sub-region of the FR that is facing the rotor blade tip during the portion of the rotational revolution,
wherein the FR sub-region includes a transition from the main body radius of curvature to a sub-region radius of curvature that is different from the main body radius of curvature, and
wherein the main body radius of curvature has a first center point along the first longitudinal axis and the sub-region radius of curvature has a second center point that is offset from the first longitudinal axis.

19. The internal mixer according to claim 18, wherein the second center point is offset from the first longitudinal axis in a horizontal direction and a vertical direction.

20. The internal mixer of claim 18, wherein the FR sub-region includes a third radius of curvature having a third center point that is offset from the first center point and the second center point.

* * * * *